United States Patent
DuCharme, Jr. et al.

(10) Patent No.: US 6,200,510 B1
(45) Date of Patent: Mar. 13, 2001

(54) METHOD FOR THE CONTACT PRINTING OF CELLULOSE FOOD CASINGS

(75) Inventors: Paul Edmund DuCharme, Jr., Tinley Park; Rama Ramagopal, Bolingbrook, both of IL (US)

(73) Assignee: Viskase Corporation, Chicago, IL (US)

( * ) Notice: Subject to any disclaimer, the term of this patent is extended or adjusted under 35 U.S.C. 154(b) by 0 days.

(21) Appl. No.: 09/169,990

(22) Filed: Oct. 13, 1998

(51) Int. Cl.[7] .................................................. A22C 13/00
(52) U.S. Cl. ................. 264/132; 264/211.18; 264/211.2; 264/232; 426/105; 426/383; 428/34.8
(58) Field of Search ................ 264/132, 211.13, 264/211.18, 211.2, 232; 428/34.8; 426/105, 383, 414

(56) References Cited

U.S. PATENT DOCUMENTS

| | | |
|---|---|---|
| 1,959,978 | 5/1934 | Freund . |
| 2,255,810 | 9/1941 | Replogle . |
| 2,492,441 * | 12/1949 | Reichel ................................ 99/176 |
| 2,857,283 | 10/1958 | Firth et al. . |
| 2,860,052 | 11/1958 | Firth et al. . |
| 3,293,340 | 12/1966 | Wearring . |
| 3,912,839 | 10/1975 | Ramagopal . |
| 5,084,283 * | 1/1992 | Oxley et al. ............................ 426/87 |
| 5,702,783 * | 12/1997 | Nicholson et al. .................. 428/34.8 |
| 5,834,076 * | 10/1998 | Ferrero et al. ....................... 428/34.8 |

FOREIGN PATENT DOCUMENTS

| | | |
|---|---|---|
| 94 10 242 | 8/1994 | (DE) . |
| 0 340 775 | 8/1989 | (EP) . |
| 0 738 471 A2 | 10/1996 | (EP) . |
| 1429491 | 3/1976 | (GB) . |
| 2314806 | 1/1998 | (GB) . |

* cited by examiner

Primary Examiner—Jan H. Silbaugh
Assistant Examiner—Edmund H. Lee
(74) Attorney, Agent, or Firm—Roger Aceto

(57) ABSTRACT

A method of applying an indicia to the surface of a cellulose casing by non contact printing wherein the indicium is applied in-line with the casing manufacture at a location between the wet end and the dry end of the casing manufacturing process wherein the indicia comprises an ink that is cured and cross linked with the cellulose prior to the casing reaching the dry end of the process. The indicia preferably is in the form of a dot matrix pattern that is visible yet presents no barrier to the passage of smoke.

8 Claims, 2 Drawing Sheets

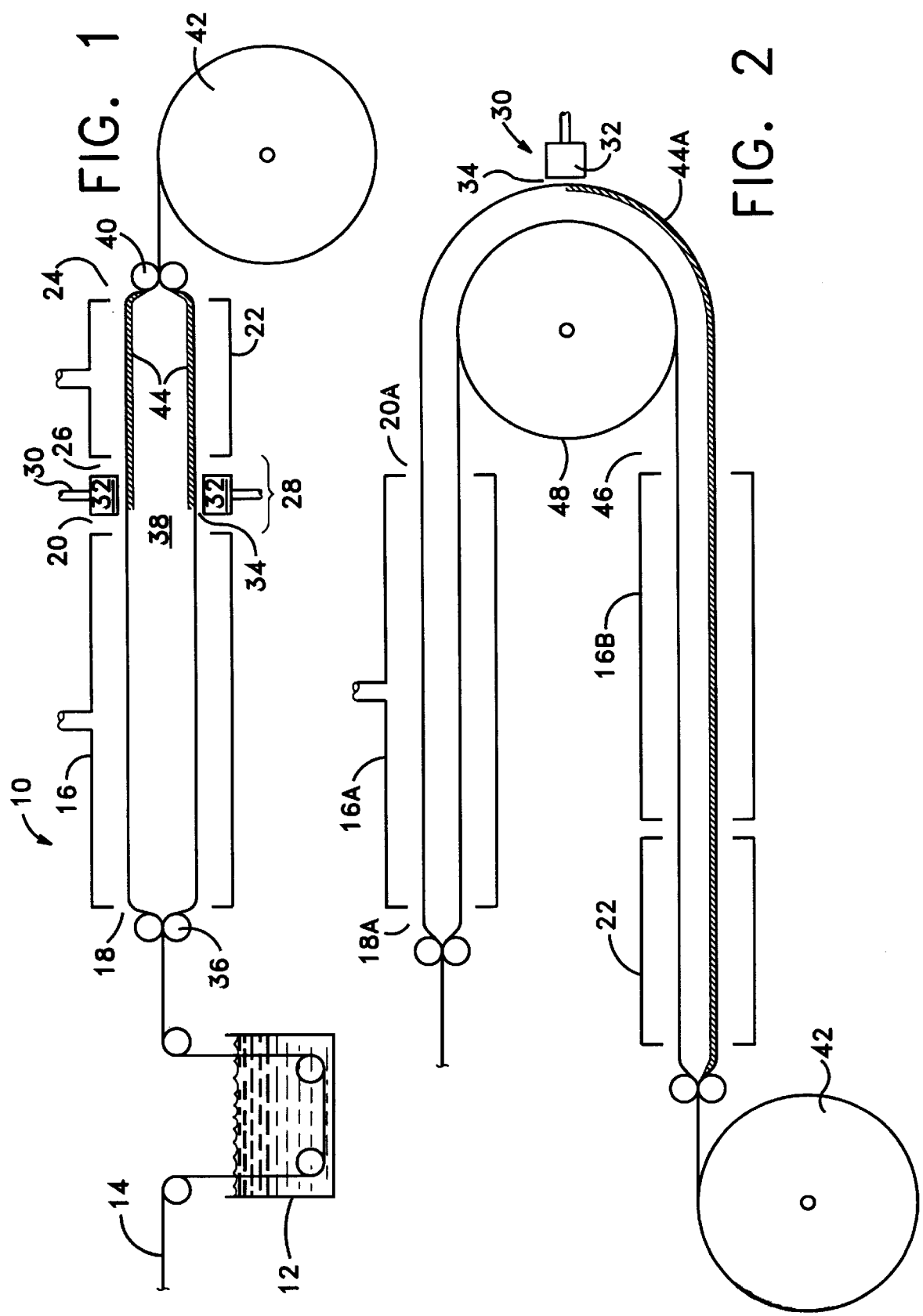

METHOD FOR THE CONTACT PRINTING OF CELLULOSE FOOD CASINGS

TECHNICAL FIELD

The present invention relates to the production of cellulose food casings and more particularly to a method of making a transparent, clear cellulose food casing having distinctive indicia applied to the outside surface of the casing.

BACKGROUND OF THE INVENTION

The production and use of cellulose food casings for the manufacture of frankfurters and the like is well known in the art. Automatic stuffing machines are available which stuff an uncooked meat or poultry emulsion into a long tubular casing while simultaneously forming the stuffed casing into links. The result is a long string of sausage links Lip to 40 to 50 meters long or longer.

The long string is processed to cook or cure the emulsion. This often involves exposing the string to a natural smoking operation or to a shower of liquid smoke. In either case the smoke permeates the casing and imparts both color and taste to the encased sausage. After processing, the casing is removed in a high speed peeling operation to produce individual sausages ready for retail packaging. Typically, "skinless" frankfurters are produced in this fashion.

At present, the only commercial process for manufacturing a cellulose casing involves the well-known viscose process. In the viscose process, a natural cellulose is contacted with a strong base to produce alkali cellulose. The alkali cellulose then is reacted with other chemicals to produce cellulose xanthate, a soluble cellulose derivative. The xanthate is dissolved in an aqueous solution of sodium hydroxide and extruded as a tube into an acid bath. The acid reacts with the xanthate to regenerate the cellulose in the form of a hydrated cellulose gel. Thus, with the viscose process, there is a first chemical reaction to create a soluble cellulose derivative and a second chemical reaction to regenerate the cellulose from the derivative. The gel is then washed, plasticized with a polyol such as glycerin and then is dried from a moisture content of 200% or more to a moisture content of less than 15% and preferably to about 5% to 10% based on the weight of dry cellulose in the casing or "bone dry gauge" (BDG).

Drying sets the properties of the tubular cellulose casing. Typically the dry casing then is passed through a steam chamber to remoisturize the cellulose to a moisture level of about 10 to 25% BDG. At this level the casing is sufficiently pliable to permit further handling without damage.

More recently, a solution process has been adapted to the production of cellulose casing. Reference is made to U.S. Pat. Nos. 5,277,857 and 5,451,364 for details of the process. In brief, in the solution process the natural cellulose undergoes a direct dissolution by a cellulose solvent such as N-methyl-morpholine-N-oxide (NMMO). The resulting cellulose solution is thermoplastic in that it is solid at room temperature. The solution is extruded at about 100° C. as a tube into a bath containing a non solvent for the cellulose such as water. In the bath the solvent is extracted from the extruded tube to precipitate or regenerate the cellulose as a hydrated cellulose gel. Thus, in the solution process there is no chemical reaction and the cellulose is non derivitized. For purposes of the present invention, "non derivitized" cellulose means a cellulose which has not been subjected to covalent bonding with a solvent or reagent but which has been dissolved by association with a solvent or reagent through Van der Waals forces and/or hydrogen bonding. As in the viscose process, the tube of cellulose gel is washed (to remove residual solvent), dried to form a cellulose film and set properties and then the dried film is remoisturized.

As noted above, after the casing is stuffed and processed to form a string of sausage links, the casing is peeled from the sausages in a high speed peeling operation. One problem associated with the high speed peeling is that the process is not always 100% successful and occasionally, bits or sections of casing remain on the sausage. Since the cellulose casings are transparent, the presence of casing on the sausage is difficult to determine by visual inspection.

To facilitate detection by visual inspection, it is customary to provide the transparent casing with indicia, such as stripes or to color the casing. As used hereinbelow, the term "indicia" unless otherwise indicated, is intended to mean any color, logo, stripe or other marking either to facilitate detection of casing on the surface of a peeled sausage or to function as an identifier for other purposes.

It is common to expose the string of sausage links to a smoke treatment. Accordingly, it is important that the indicia on the casing not interfere with the ability of the smoke to permeate the casing. Otherwise, the indicia will act as a mask that prevents the passage of the smoke so that the resulting sausage will be lighter in color below the indicia. It also is important that the ink or color comprising the indicia does not rub off during the handling of the casing or the string of sausages.

Also, it is customary to print logos or other identifying information on casing. Stripes or color to facilitate casing detection after stuffing can be applied in this fashion. However, printing off line adds handling and manufacturing steps to the process. Accordingly, for purposes of economy, it is desirable to apply the indicia in-line with the casing manufacturing process.

EP 0 738 471 discloses a casing for use in so called "shadow printing" which takes advantage of the printing being a barrier to the passage of smoke. Here, the casing is printed with a liquid polyvinylidene chloride (PVDC) containing a pigment. The printed area acts as a mask so that after the sausage is smoked and the casing is peeled off, the surface of the sausage beneath the printing is a lighter color. In this manner the image of the printing is, in effect, transferred to the sausage. The '471 Patent gives no details of the condition of the casing when the printing is applied other than to say that various printing methods such as ink jet, flexography or mezzotint can be used to apply the PVDC to the casing. However, since flexography and mezzotint are suggested printing methods for the PVDC ink it is believed that the printing as described in the '471 Patent is applied to the casing in an off line operation.

U.S. Pat. No. 2,860,052 discloses an attempt to put a contrasting color pattern on a casing in-line with the manufacturing process. In U.S. Pat. No. 2,860,052 a naphthalate dye is applied by a print roll that bears directly against the surface of a flattened gel casing as the casing leaves a wash tank. The casing then is passed through a color salt where the coupling of the dye and salt produce the desired color pattern on the surface of the casing. It is not believed that the process as disclosed in this U.S. Patent is commercial. Also, bearing a print roll directly against the gel casing is risky in that the gel casing is easily torn and pressing against it may compromise the final properties of the cellulose film.

The current commercial practice for providing a contrasting mark or color on the casing in-line with the casing manufacturing process is represented by U.S. Pat. No.

3,334,168 and Canadian Patent No. 2,047,477. In both patents the color is incorporated into the extruded viscose such that the casing produced can be more easily detected on the peeled sausages.

U.S. Pat. 3,334,168 discloses mixing a pigment, such as carbon black, with viscose and injecting a stream of the mixture into the wall of the extruded tube of viscose. Upon regeneration of the cellulose, the injected stream appears as stripes imbedded in the wall of the casing.

Canadian Patent No. 2,047,477 discloses dispersing a water soluble pigment uniformly throughout the viscose except for an area running longitudinally along the extrusion so that after regeneration of the viscose, the casing wall is uniformly colored except for a clear window running the length of the casing. Neither the injection of a carbon black pigment nor the coloring of the viscose with a soluble dye act as barriers to the diffusion of smoke through the casing.

While the in line methods disclosed in U.S. Pat. 3,334,168 and Canadian 2,047,477 are suitable for a derivitized casing, they are not suitable for non derivitized cellulose casing. This is because the addition of a dye or pigment into the stream of the molten cellulose solution possibly can alter the properties of the resulting casing. The dye or pigment added to the cellulose solution also may compromise the subsequent recovery of the solvent which is important to the economics of making a non derivitized cellulose casing. Accordingly, when extruding the non derivitized cellulose casing, it is preferred not to introduce a foreign element such as a dye or pigment into the solution stream. This means that any color or indicia must be applied after the solvent has been removed and the hydrated cellulose gel is formed.

When applying Indicia to the surface of a cellulose casing in an off line process, it is conventional to incorporate a dye or pigment into a carrier which cross links to form a film and which cross links with the cellulose substrate or bonds to the cellulose substrate such as by hydrogen bonding. This cross linking prevents the indicia from rubbing off when the casing is rewetted as occurs during stuffing. However, forming a film which cross links with the cellulose presents other problems for the stuffing operation. For example, a film applied to the casing surface can act as a mask and prevent uniform smoke penetration. Accordingly, the problem is to apply a stripping or other identifiable indicia to the casing which does not mask the passage of smoke.

Thus, the desiderata of the present invention include applying indicia to either a derivitized or non derivitized cellulose casing in an in-line process that does not bring any printing means to bear against the casing and that provides indicia which adheres to the casing surface by cross linking without masking the passage of smoke.

Accordingly, an object of the method of the present invention is to apply indicia to the exterior of a cellulose casing in-line with the casing manufacturing process.

Another object of the method of the present invention is to apply indicia to the exterior of the casing in a non contact printing operation.

A further object of the method of present invention is to apply indicia to the exterior of a cellulose casing in the form of an ink including a carrier which is crossed linked to form a film and which cross links to the cellulose to bind the film to the cellulose yet does not mask the passage of smoke, the cross linking being initiated by heat.

Yet another object of the present invention is a cellulose food casing having indicia which is cross linked to the casing surface and yet permits the uniform diffusion of smoke through the casing.

SUMMARY OF THE INVENTION

In the method of the present invention, a tube of hydrated cellulose gel is produced and washed in a conventional manner and without any markings, stripes, contrasting color or other indicia being added during the extrusion process. Thus, there is no injection of a colored viscose into the extruded viscose stream in the case of a derivitized cellulose and no mixing of a color with the cellulose solution in the case of a non derivitized cellulose. This simplifies the extrusion process and in the case of non derivitized cellulose, it avoids the addition of constituents directly to the cellulose solution.

After washing, the gel is plasticized and then it enters a drier. The hydrated cellulose gel typically enters the drier at a moisture content which can be as high as 200% to 270% on a BDG basis. In the drier the tube of cellulose gel typically is inflated and dried to a moisture content of less than 15% and preferably to between 5% and 10% on a BDG basis to effect a cross linking of the cellulose by hydrogen bonding. The tubular cellulose film then enters a moisturizing chamber where its moisture content is increased typically to about 10 to 25% on a BDG basis. The entrance to the drier is the "wet" end of the process and the exit of the moisturizer is the "dry" end.

The application of indicia according to the present invention is accomplished by a non contact printing means, as for example, an air brush or ink jet printer so that the indicia is applied without physically contacting the surface of the cellulose. Preferably, the indicia comprises a heat cured ink. For purposes of the present invention a "eat cured" or "heat curable ink" means an ink composition which either requires the application of heat to initiate a curing reaction or which requires the continuous application of heat to effect the cure. The heat cured ink is applied to the cellulose at a location between the wet end and the dry end of the process. Preferably it is applied at a cellulose location downstream from the wet end so the ink can be applied to a surface which is drier than the hydrated cellulose gel entering the drier. In this respect, it has been found that when an ink is applied to the surface of the hydrated cellulose gel, subsequent heat curing does not act to permanently bond the ink to the cellulose surface. The result is that the ink rubs off when the casing is rehydrated as occurs during stuffing of a sausage casing.

Depending upon the drier temperature, residence time and initial moisture content of the hydrated cellulose gel, the location for the application of the heat cured ink is selected so that the cellulose at this location has a moisture content which is less than about 200% on a BDG basis and preferably less than 60%. This provides a cellulose surface having a moisture content much less than the moisture at the wet end upon which to apply the ink. Moreover, the remaining time in the drier or in the warm environment of the moisturizing chamber is sufficient to effect a cure of the ink so that the indicia becomes bonded to the cellulose surface.

The indicia applied to the cellulose surface by an air brush or ink jet printer can comprise either a pigmented ink or dye based system. For example, an air brush may be used to apply a pigmented ink to the cellulose surface. A suitable ink for use by air brush application is a conventional reactive ink system including two components, a dispersion component and a reactor component. The dispersion component preferably is a blend of a polyester resin, a solvent, wax and a suitable pigment such as carbon black. The reactor component is a chemical which reacts with the polyester resin, such as an isocyanate. The two components are mixed shortly before application and begin to react to form polyurethane as the reaction product with the pigment being dispersed in this reaction product.

This mixture is air brushed onto the cellulose surface as a stripe. Exposure to the heat in the drier and moisturizing chamber acts to drive off the solvent leaving a cross linked polyurethane film matrix. Moreover the film matrix is adhered to the cellulose by unreacted isocyanate which acts to cross link the polyurethane to the cellulose at the casing surface. Imbedded in this matrix are the particles of the carbon black pigment. Since the polyurethane film is cross linked and is cross linked with the cellulose of the casing surface, the film and pigment remain adhered to the casing surface even under rewet conditions.

The polyurethane film is a barrier to the passage of smoke. However it is believed that the pigment particles provide some disruption in the barrier properties so the barrier to the smoke is reduced. Also, the width and density of the stripe can be controlled to minimize the masking effect. If smoke permeation is not an issue, the air brush can be used to uniformly color the cellulose to provide a colored casing or to color only part of the cellulose to provide a colored casing having a clear window as disclosed in Canadian Patent No. 2,047,477.

An alternative non contact printing method is ink jet printing. Ink jet printing is a well known technique in which the printed characters are deposited by projecting a stream of ink droplets through a minute orifice of a nozzle and onto a surface. The direction of the stream of droplets is controlled so that the droplets are caused to form the desired printed indicia on the surface. In a continuous ink jet printing system, the direction of the stream is controlled electronically.

For purposes of ink jet printing, it is preferred to use an ink comprising a soluble dye rather than a pigment because, in general, the particle sizes of pigments are too large to pass the nozzle of the ink jet printer. Also, a reactive system as described above causes clogging of the minute orifice of the ink jet printer. Accordingly, it is preferred that a reactive system to produce a cross linked film matrix that is also cross linked with the cellulose include a blocking agent that prevents the film forming reaction until after the ink has been applied to the casing cellulose surface. An ink suitable for use includes at least a dye, a solvent, agents which react to produce a cross linked film as a reaction product that cross links to the cellulose, and a blocking agent that prevents the reaction until after the ink has been applied. A polyester and a blocked isocyanate are suitable film forming agents wherein heating causes unblocking of the isocyanate to initiate the reaction. The ink composition also must posses the property of responding to a magnetic force so the direction of the stream of ink droplets it can be controlled electronically. After the ink is applied to the cellulose surface, heating as in the moisturizing chamber or in the drier initiates the reaction and the residence time at the elevated temperature helps to cure the film matrix.

A uniform application of continuous indicia, such as a solid stripe, would provide a barrier to the passage of smoke. While the width of the stripe can be controlled to minimize the barrier effect, use of an ink jet printer allows greater flexibility in applying a pattern which is clearly visible yet does not mask the passage of smoke. With an ink jet, indicia can be applied intermittently to provide a pattern which is distinct and yet provides enough open space for smoke permeation. In the case of a striped casing, the intermittent pattern preferably is in the form of a dot matrix pattern. The size and distribution of the dots are sufficient to render pieces of casing on the peeled sausage clearly visible yet the unmarked spaces around the dots in the matrix permit the permeation of enough smoke to uniformly color the surface of the sausage below the casing.

Use of an ink jet printer, as noted above, provides the opportunity to apply a simulated stripe composed of a dot matrix pattern in the form of a logo or an alpha numeric code or the like to provide an identifiable casing. In this case the design or code can simulate a stripe along the length of the casing to aid in the detection of casing pieces on a peeled sausage while also providing an identifier to the casing to indicate size or a specific sausage formulation to be stuffed into the casing.

Accordingly, the present invention may be characterized in one aspect thereof by a method of forming a transparent cellulose food casing including applying indicia to a transparent cellulose casing in-line with the casing manufacturing process comprising:

a) continuously extruding and regenerating a seamless tube of a cellulose solution or cellulose derivative to produce a hydrated tube of a regenerated cellulose gel;

b) contacting the hydrated tube of regenerated cellulose gel with a plasticizing agent;

c) passing the plasticized hydrated tube of regenerated cellulose gel into a drier, the entrance to the drier defining a wet end;

d) maintaining sufficient residence time in the drier to dry the hydrated tube down to a moisture content of less than 15% based on the weight of the dry cellulose thereby forming a tubular cellulose film;

e) passing the cellulose film from the drier and through a moisturizing chamber to raise the tubular film to a moisture content of 10% to 25% based on the weight of dry cellulose, the exit of the moisturizing chamber defining a dry end;

f) applying a film forming pigmented or soluble dye heat cured ink composition to the cellulose at a location intermediate the wet end and the dry end by non contact printing wherein the ink composition is directed at the outer surface of the passing cellulose film from across an air space, the ink composition containing film-forming reactive products; and g) heating the ink composition to effect a cure thereof prior to reaching the dry end thereby forming indicia on the cellulose film, the indicia comprising a cross linked film matrix containing the pigment or dye which film matrix is, in turn, crossed linked to the cellulose.

In another aspect the present invention is a clear, transparent food casing having indicia applied to the outer surface of the casing, said indicia comprising a simulated stripe extending the length of the casing for facilitating the identification of casing or casing pieces left on a sausage processed in said casing wherein said simulated stripe is composed of a plurality of dots applied by non contact printing on the casing surface, each of said dots comprising a barrier-forming and pigment or dye-containing cross linked film bonded to the casing surface by cross-linking with the cellulose of said casing, the size and distribution of said dots permitting a uniform permeation of said stripe by smoke whereby said casing will transfer a uniform smoke color to a sausage processed in said casing.

DESCRIPTION OF THE DRAWINGS

FIG. 1 is a schematic view illustrating one embodiment of the method of the present invention for applying indicia to a food casing;

FIG. 2 is a schematic view showing another embodiment of the method of the present invention.

DETAILED DESCRIPTION OF THE INVENTION

Figure 3:
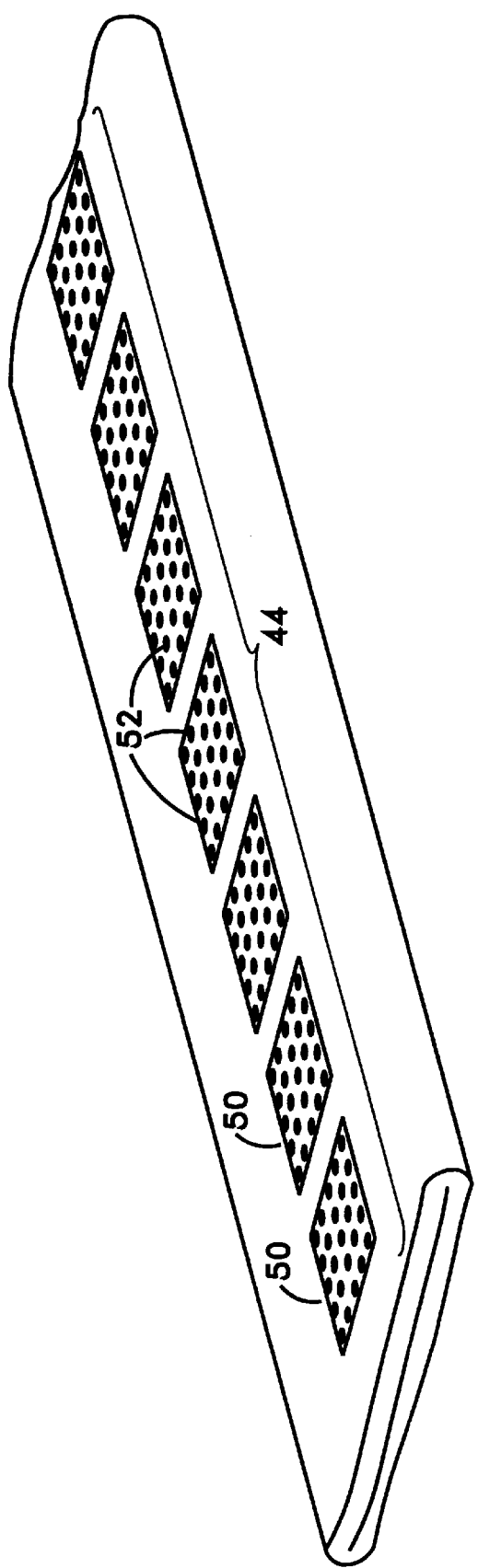
FIG. 3 is a view showing a food casing of the present invention having indicia applied according to the inventive method.

Referring to the drawings, FIG. 1 shows a portion of a cellulose casing production line generally illustrated at 10. Illustrated is a final dip tank 12 that may contain an aqueous glycerin plasticizing solution. Entering the dip tank is a tube 14 composed of a hydrated cellulose gel. The tube 14 is formed by the continuous extrusion and regeneration of cellulose by extrusion apparatus (not shown). The extrusion and regeneration may be of the conventional type for forming a derivitized cellulose casing using the viscose process or it may be of the type illustrated in the U.S. Patents mentioned above for forming a non derivitized cellulose casing.

Downstream from the final dip tank is a drier 16 having an entrance 18 and an exit 20. The drier is heated by any suitable means (not shown) such as heated dry air. The drier entrance 18 sometimes is referred to herein as the wet end in that the tube 14 of cellulose gel entering the drier is substantially fully hydrated.

In the drier, the tube of cellulose gel is dried under inflation to effect the hydrogen bonding of the cellulose thereby forming a tubular cellulose film suitable for use as a sausage casing.

Downstream from the drier is a moisture chamber 22. Moist heated air or steam from any suitable means (not shown) is passed through the moisture chamber to create a moist heat environment to remoisturize the cellulose film. The exit 24 of the moisture chamber is sometimes referred to as the "dry end" as the cellulose tube leaving the moisture chamber is at a significantly lower moisture content than the cellulose gel at the wet end 18.

As shown in FIG. 1, the drier 16 and moisturizing chamber 22 are in line so that the drier exit 20 and the entrance 26 to the moisturizing chamber define a space 28 therebetween. Disposed in the space 28 is a non contact printer 30 such as an air brush or ink jet printer. Preferably, the non contact printer includes two or more heads 32 mounted to a fixture (not shown). The fixture supports the heads at radially spaced positions so that the printing medium issuing from the printing heads is directed radially inward across an air gap 34.

In operation, FIG. 1 shows the method of the present invention as beginning with the tube 14 of regenerated cellulose in the form of a hydrated gel entering dip tank 12. It should be appreciated that at this point the tube 14 has been fully regenerated, washed and generally has been laid to a flat width as shown. In the dip tank 12 the hydrated cellulose gel is contacted with a plasticizing agent which usually is glycerin. Thus the dip tank 12 typically will contain an aqueous solution of from 5% to 10% glycerin. Other suitable plasticizers include other polyols such as propylene glycol or a poly(ethylene oxide) among others. The purpose of the plasticizer is to soften the resulting cellulose film and make it flexible so that after drying, as described hereinbelow the dried cellulose film or casing can be handled and manipulated without damage.

From the final dip tank, the tube 14 enters the drier 16. At the drier entrance the flattened tube passes between nip rollers 36. This allows inflating the tube in a manner known in the art to provide the resulting film with some degree of orientation. Generally, the tube remains inflated during its passage through the drier. A derivitized cellulose entering the drier at the wet end may have a moisture content as high as 260% to 270% on a BDG basis. The moisture content of a non derivitized cellulose at the wet end generally is lower and may range from 160% to 230% on a BDG basis. In passing through the drier, the hydrated cellulose gel is dried to a low moisture content to cross link the cellulose and set the properties of the resulting cellulose film. Both derivitized and non derivitized types of cellulose at the drier exit generally have a moisture content of 5% to 10% on a BDG basis. Thus, the inflated tube 38 leaving the drier is a relatively dry cellulose film referred to hereafter as casing.

The residence time in the drier to dry the tube of hydrated cellulose gel varies depending upon the tube diameter and heat exchange rating of the drier. For small size non reinforced casing of the type used to make frankfurters and the like, a drier temperature of about 300° F. (142.5° C.) and a residence time of 45 to 60 seconds at a running speed of 100 feet (30 meters) per minute may be sufficient.

As set out above, the casing leaving the drier generally is at such a low moisture content that subsequent handling or machining is likely to damage the casing. Accordingly the casing after leaving the drier, passes through space 28 and into the moisture chamber 22. In the moisture chamber the casing is remoisturized to about 10% to 25% on a BDG basis. The remoisturizing generally is accomplished by contacting the casing with steam or warm moist air such as 140° F. (60° C.) air at a relative humidity of 85%. On leaving the moisture chamber, the casing passes through a second pair of nip rolls 40 which flattens the casing so it can be wound onto a reel 42.

As the casing 38 passes through the space 20 between the drier and the moisturizing chamber, it passes the heads 32 of the non contact printer 30. As noted above, the positioning of the printing heads is such that there is an air gap 34 between the outer surface of the casing 38 and the printing heads. This air gap is less than 25.4 m (one inch) and preferably less than 12.5 mm (½ inch). Thus there is no physical contact of the heads with the casing surface. Each printing head is arranged to direct a stream of ink at the casing surface to create a stripe or other pattern indicated at 44 on the casing. As noted above, the ink used includes a film forming agent that is heat cured to form a cross linked film that is cross linked with the cellulose of the casing.

After the ink application, curing of a blocked isocyanate system can be initiated by the heat in the moisture chamber 22. In the case where heat is required to complete the cure, the residence time and temperature conditions in the moisture chamber as noted above are sufficient to cure the ink to the point where it does not block as the casing is gathered onto reel 42.

Printing on a dry surface, such as on the casing 38 leaving the drier, is a preferred method. However, printing also can be done at an upstream location so as to provide curing time in the drier as well as in the moisturizing chamber. FIG. 2 shows an embodiment wherein a split drier having two sections 16A and 16B is used. As shown in FIG. 2, the two sections are arranged one above the other. Between the two sections is a turn around wheel 48 that reverses the direction of the tubing so the tubing leaving the drier exit 20A of the first drier section is turned into the entrance 46 of the second drier section. Thereafter, the casing moves through the moisturizing chamber 22 and then is gathered onto reel 42 as set out above.

In the embodiment shown in FIG. 2, the non contact printer 30 is positioned at the split between the drier sections. While only one print head 32 is shown in FIG. 2, it should be appreciated that two or more of the print heads can be arranged to apply one or more stripes or lines of printing 44A to the surface of the casing. The casing at the drier split is not fully cured but its moisture content, which is about 25% to 60% % on a BDG basis, is considerably less than the wet end moisture of up to 200% or more. In any event, the moisture at the drier split is low enough that ink from the non contact printer can be applied to the surface of the tubing as shown at 44A. After the ink is applied, the second drier section 16B provides residence time in addition to the moisturizing chamber 22 to insure the curing of the ink. The additional curing time also is preferable if an ink system using a blocked isocynate is used.

As noted above, above, printing on the casing which forms a film cross linked to the casing, will, to some, act as a barrier to the passage of smoke through the casing. The result is that the surface of the sausage beneath the printing is a lighter color when the casing is removed. Accordingly, another aspect of the present invention is to apply the heat cured ink in a pattern which minimizes the barrier effect and yet provides a stripe appearance which aids detection of casing pieces remaining on the sausage after peeling.

For this purpose, FIG. 3 shows that the stripe 44 on the casing surface is simulated by a dot matrix pattern. The pattern as shown appears as a plurality of individuals squares or rectangles 50 extending longitudinally along the casing. These individual squares or rectangles together make up the stripping 44. In addition, each square or rectangle 50 is composed of a plurality of individual dots 52. While each dot is a barrier to the passage of smoke, the size of each dot and the scattering of the dots in the pattern allow smoke to pass through the striped area of the casing and diffuse into the sausage beneath the dots. This minimizes the barrier effects of the printing so the sausage surface has a uniform color after the casing is removed. The size of the individual dots and the dot density that minimizes the barrier effect depend in part upon the ink composition and the composition of the smoke which is applied.

A dot density having the desired attributes of enough visibility to detect unpeeled fragments of casing on the sausage without causing a non uniform smoke coloration may vary depending upon the particular pattern used. For example in one arrangement using a polyester and a blocked isocyanate as the reaction components, each of the segments 50 in FIG. 3 making up the simulated stripe are rectangles which measure about 2.2 mm in the longitudinal or machine direction and about 3.7 mm in the transverse direction. Each segment in turn contains thirty-five dots arranged in seven rows of five dots each. The rows are about 0.5 mm apart. The dots are about 0.4 mm in diameter. This provides a simulated stripe which is clearly visible without compromising a uniform smoke coloration.

Thus it should be appreciated that the non contact printing method of present invention accomplishes its intended objects. It allows a stripe or other indicia to be applied in an in-line process which eliminates the need to add pigments or dyes to the extruded material. This is particularly important where the extruded material constitutes a solution of non derivitized cellulose because such additives may compromise the ability to recover solvent from the solution. Use of a heat cured ink allows the application of the indicia at a location between the wet and dry ends of the process so as to utilize the conventional drying and warm moist air remoisturizing steps to cure the ink. Moreover curing the ink forms a cross linking bond to the cellulose which is needed to insure that the indicia remains adhered to the casing when the casing is re wet. The non contact printing avoids pressing printing members against the casing during the casing manufacturing process and thus avoids a source of possible damage to the casing. Further, the use of an ink jet as the printing means of choice allows the application of a simulated stripe on the casing composed of a dot matrix pattern that is visible for the purpose of detecting the casing and yet permits the diffusion of smoke through the casing to uniformly color a sausage processed in the casing. Use of an ink jet printer also allows the application of a simulated stripe in the form of other, more complex designs, alpha numeric codes or bar codes.

Having described the invention in detail, what is claimed as new is:

1. A method of forming a cellulose food casing having a smoke permeable indicia applied to the outer surface of the casing comprising:

a) continuously extruding and regenerating a seamless tube composed of a cellulose solution to form a hydrated gel tube comprising a regenerated cellulose having a moisture content of at least 160% based on the weight of dry cellulose;

b) partially drying in a drier the hydrated gel tube to a moisture content of less than to 60% based on the weight of dry cellulose;

c) applying a film-forming heat curable pigmented or soluble dye ink composition including film forming reactive products to the partially dried tube by non contact ink jet printing means that direct the ink composition against an outer surface of the partially dried tube from across an air space and applying the ink composition to said outer surface in a dot matrix pattern;

d) further drying in the drier the partially dried tube to a moisture content of less than 15% by weight of the dry cellulose to produce a tubular cellulose film suitable for use as a sausage casing;

e) said further drying causing the curing of the film forming reactive products such that each dot of the dot matrix pattern is a cross linked film that is cross linked to the cellulose comprising the tube outer surface and each dot of the matrix containing the pigment or dye composition, the dots of the dot matrix being of a size and distribution sufficient to provide visible indicia on the casing while permitting a uniform permeation of smoke through the casing in the area covered by the dot matrix pattern; and thereafter f) moisturizing the tubular cellulose film to a moisture content of about greater than 10% to 25% based on the weight of dry cellulose.

2. A method as in claim 1 comprising inflating the hydrated gel tube for said partial drying and applying the ink composition to the outer surface of the inflated tube.

3. A method as in claim 1 wherein said partially drying and further drying occur respectively in two spaced drier sections and applying the ink composition occurring at a location between the two drier sections.

4. A method as in claim 1 wherein applying the ink composition provides said dot matrix pattern in a form which simulates a stripe.

5. A method as in claim 1 wherein said applying the ink composition arranges the dots of the dot matrix pattern in a plurality of rows and columns that define a plurality of spaced rectangles that simulate a stripe on the casing.

6. A method as in claim 1 wherein the ink composition comprises a dye, a solvent, and a heat curable blend of polyester and a block isocyanate.

7. A method of forming a tubular cellulose smoke permeable food casing having indicia on its outer surface wherein the indicia is applied in-line with the cellulose casing manufacturing process comprising:

a) continuously extruding and regenerating a seamless tube of a cellulose solution to produce a tube composed of hydrated non derivatized cellulose gel;

b) plasticizing the tube of hydrated cellulose gel and thereafter passing it into and through a drier, the tube of hydrated cellulose gel having a moisture content of 160% to 230% based on the weight of dry cellulose on entering into the drier entrance and a moisture content of 5% to 10% on exit from the drier;

c) selecting a location between the drier entrance and exit where the tube of hydrated cellulose gel is partially dried and the moisture content of the tube of hydrated cellulose gel is between about 25% and less that 60% on a dry cellulose basis and at the selected location applying a film forming soluble dye ink composition to the cellulose to form said indicia, the ink composition being applied by ink jet printing wherein the ink composition is directed across an air space and onto an outer surface of the cellulose, the ink composition containing film-forming reactive products applied in a dot matrix pattern comprising a plurality of dots arranged in rows and columns that define a plurality of rectangles spaced along the surface to simulate a stripe; and d) curing the ink composition between said selected location and said exit to form the reactive products to a cross linked dot matrix film which is in turn cross linked to the cellulose wherein the dots comprising the cross linked dot matrix film are impermeable to smoke but the dot matrix pattern providing sufficient space around each dot to permit passage of sufficient smoke through the indicia to uniformly color the surface of a sausage product processed in the casing.

8. A method as in claim 7 wherein the film-forming reactive products comprise a polyester and an isocyanate including a blocking agent and said curing is accomplished by heating to free the blocking agent to unblock the isocyanate so it can react with the polyester during the passing of the cellulose from the selected location to the drier exit.

* * * * *

UNITED STATES PATENT AND TRADEMARK OFFICE
CERTIFICATE OF CORRECTION

PATENT NO. : 6,200,510 B1
DATED : March 13, 2001
INVENTOR(S) : Paul Edmund DuCharme, Jr. and Rama Ramagopal It is certified that error appears in the above-identified patent and that said Letters Patent is hereby corrected as shown below:

<u>Title page,</u>
Change "Method for the Contact Printing" to -- Method for the Non Contact Printing"--

<u>Column 1,</u>
Line 1, change "Method for the Contact" to -- Method for the Non Contact --

Signed and Sealed this

Twenty-fifth Day of September, 2001

Attest:

NICHOLAS P. GODICI
Attesting Officer *Acting Director of the United States Patent and Trademark Office*